Sept. 14, 1948. P. H. MURPHY 2,449,311
LAND VEHICLE, ADAPTED FOR FIRE SUPPRESSION
Filed Sept. 6, 1945 2 Sheets-Sheet 1
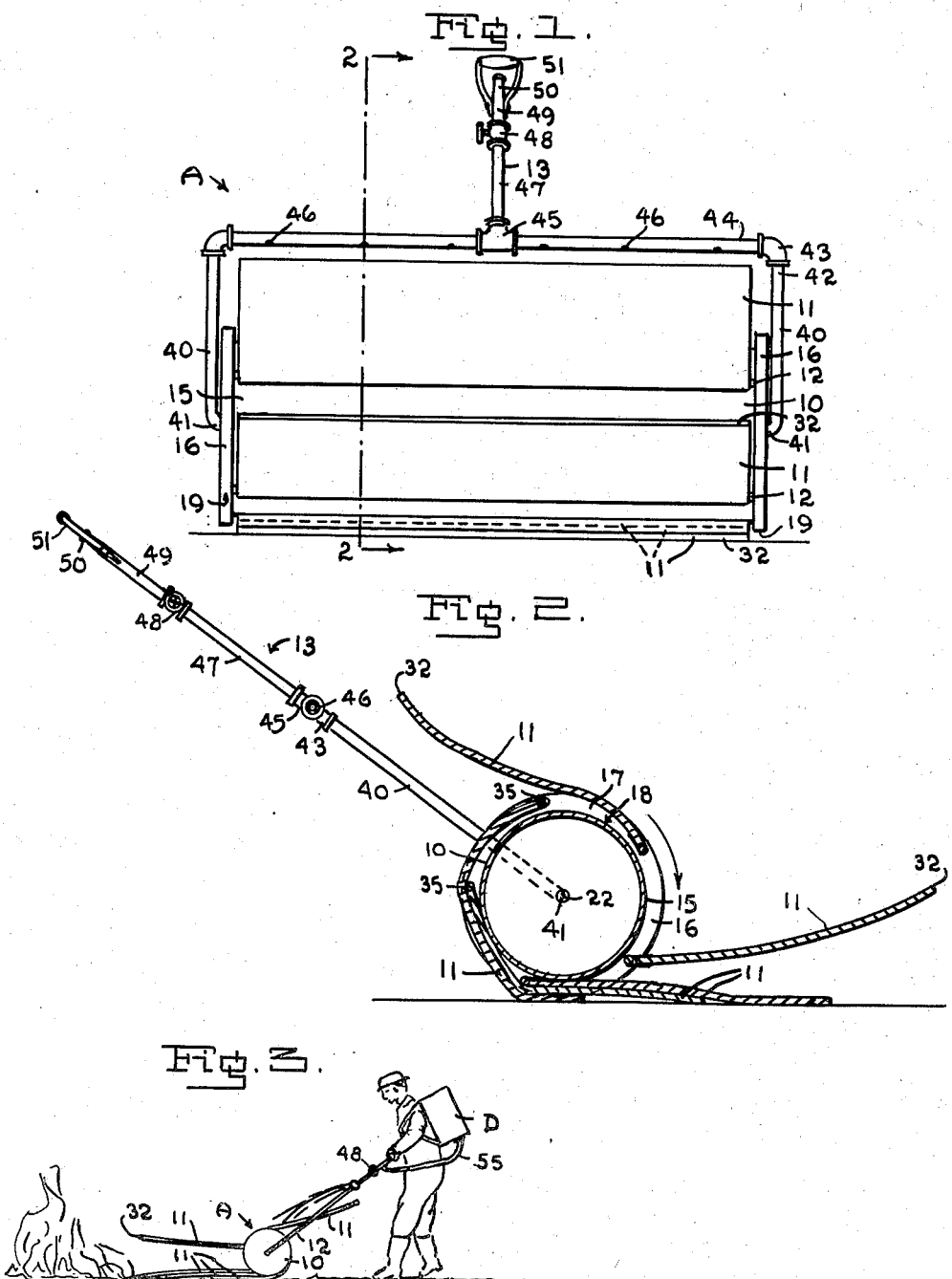
INVENTOR.
Philip H. Murphy Sept. 14, 1948. P. H. MURPHY 2,449,311
LAND VEHICLE, ADAPTED FOR FIRE SUPPRESSION
Filed Sept. 6, 1945 2 Sheets-Sheet 2
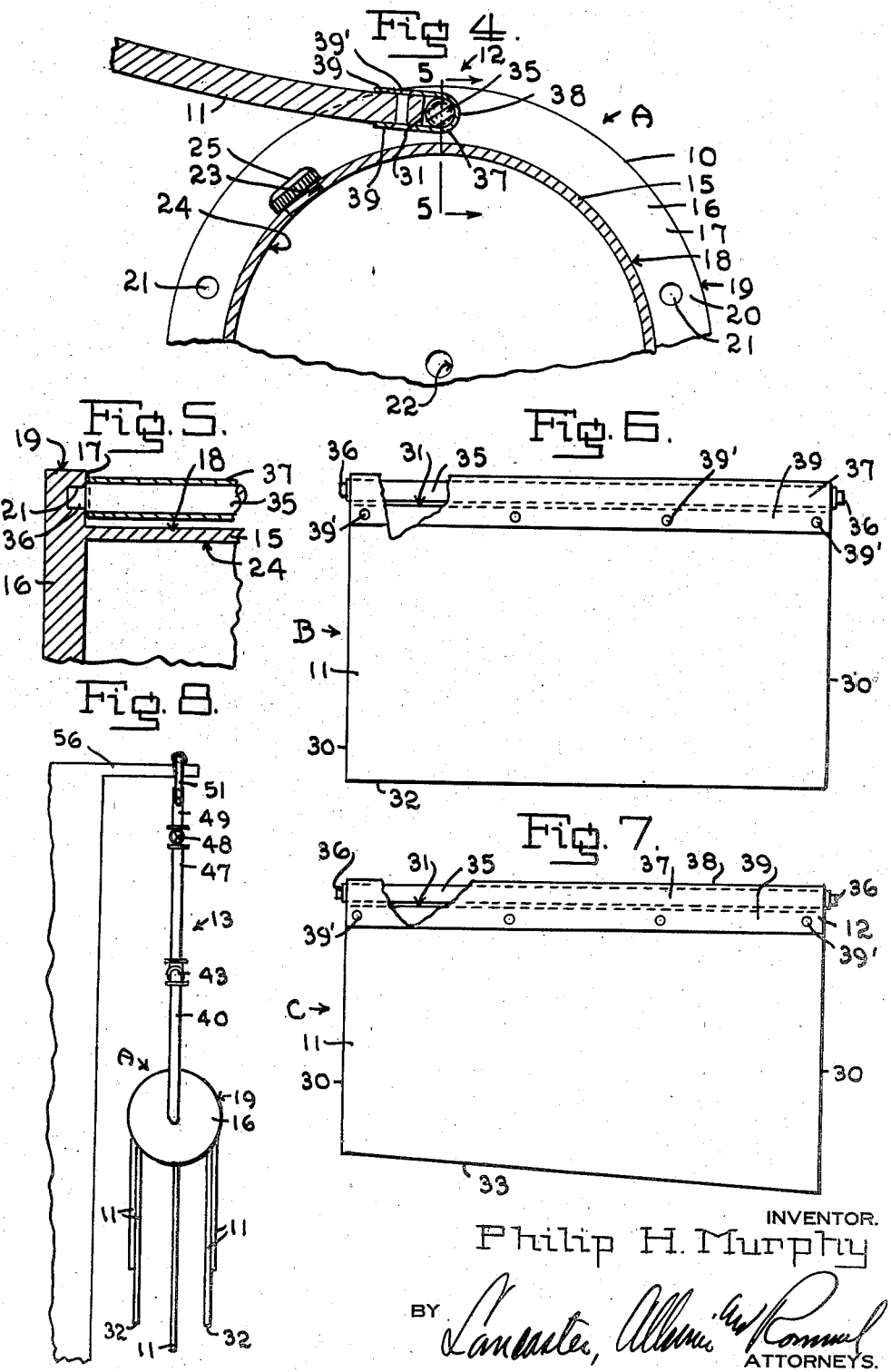
INVENTOR.
Philip H. Murphy
BY Lancaster, Allwine and Rommel
ATTORNEYS.

Patented Sept. 14, 1948

2,449,311

UNITED STATES PATENT OFFICE 2,449,311

LAND VEHICLE ADAPTED FOR FIRE SUPPRESSION

Philip H. Murphy, Helena, Mont.

Application September 6, 1945, Serial No. 614,774

4 Claims. (Cl. 169—1)

This invention relates to land vehicles and more particularly to land vehicles adapted to aid in suppressing fires.

One application of the invention is in suppressing grass or range fires, although the vehicle is not confined to such use.

An important object of the invention is to provide a land vehicle, including a horizontally-rotating element or rotor, and a plurality of flexible paddles secured thereto at one of their ends, and upon which the element progressively rotates, thus affording increased traction for the vehicle.

Another important object is to provide a vehicle, as described, the paddles of which aid in the suppression of fires by the separation principle as determined by the United States Forest Service. That is, that suppression is the result of the separation of fuel from flame, oxygen from flame and/or fuel, and/or heat-generated gas or gases from flame, fuel and/or oxygen.

Still another important object is to provide a fire-suppressing apparatus, light in weight, exceptionally mobile and one which employs a combined means to separate the flame from the gas, which its heat generates from the combustible material, and to thrash and smother or blanket fires.

Among other objects are to provide a fire-suppressing apparatus which is free from gears, belts, chains, pulleys and the like, consists of but few and simple parts, covers a considerable area when in operation but occupies only a small space for shipment, storage and the like.

Other objects and advantages of the invention will be apparent during the course of the following detailed description of the invention, taken in connection with the accompanying drawings, forming a part of this specification and in which drawings:

Figure 1 is a side elevation of the novel land vehicle.

Figure 2 is a vertical section thereof, on substantially the line 2—2 of Figure 1.

Figure 3 is a view illustrating the same in use.

Figure 4 is an enlarged, fragmentary, transverse section of a rotor portion of the novel vehicle.

Figure 5 is a section upon substantially the line 5—5 of Figure 4.

Figures 6 and 7 are plan views of two types of paddles employed in the new vehicle.

Figure 8 is an end elevation thereof, suspended for storage.

In the drawings wherein for the purpose of illustration is shown a preferred embodiment of the invention as a whole and a modification of the paddle structure, the letter A designates the vehicle as a whole, the letter B, one type of flap or paddle, C, another type of flap or paddle, and D a reservoir for water or the like.

The vehicle A includes a rotor 10, flaps or flexible paddles 11, secured at an end of each thereto by means 12 and a handle 13 for guiding the rotor 10, embodying conduits for conveying a fluid to be discharged upon the flaps or paddles 11.

Preferably, the rotor 10 includes a cylindrical portion 15, disposed on a horizontal axis, and a disc portion or member 16 having a substantially cylindrical periphery closing each end of the cylindrical portion 15, the diameters of the discs being greater than that of the cylindrical portion 15 but the axis of all being concentric so that there is a rim section 17 to each disc, extending from the outer surface 18 of the cylindrical portion 15 to the edge face 19 of each disc portion 16. In the confronting (inner) faces 20 of each rim section 17 are a plurality of spaced-apart sockets 21 for attachment of a portion of the means 12 to be subsequently described. At the axial center of each disc portion 16 is an opening 22 for portions of the handle 13 to be described.

If desired, there may be a screw-threaded opening 23 in the cylindrical portion 15, communicating with the interior 24 of the cylindrical portion and closed by a screw threaded plug 25. Preferably, the rotor 10 and plug 25 are of metal, such as iron or steel.

The flaps or flexible paddles 11 of this invention are important features thereof. They are, preferably, of some high fire-resistant material, although materials such as gum-impregnated cord or fabric belting, rubberized fabric, and heavy, coarse, woven cotton fabric may be employed. These are of a width very slightly less than that of the length of the cylindrical portion 15. Their length is important. Not only must they have a length sufficient to cover a considerable area when disposed flat upon that area, but they must be long enough and thick enough in order that several will take positions, one upon another, beneath the cylindrical portion 15 and form a tread therefor, preferably raising the disc portions 16 above the ground or other supporting surface. Thus they have dual functions in this novel fire-fighting vehicle.

In Figure 6 is shown one embodiment of the paddle or flap, designated as B. This has substantially parallel end edges 30, an inner side edge 31, designated in Figure 4, forming substantially right angles with the edges 30 and a forward or outer side edge 32, substantially paralleling the edge 31.

However, the flap or paddle may take the form shown in Figure 7. Here the edges 30 and 31 are substantially like the corresponding edges of the paddle or flap shown in Figure 6. But the outer or forward edge 33 forms an acute angle with one end edge 30 and, of course, an obtuse angle with the other end edge 30. This modification is found desirable since it tends to direct the draft created by the descending flaps to one side of the path of travel of the novel vehicle and, consequently, if the vehicle has already traversed a path to the right of its subsequent path, sparks, flame, ash and cinders are directed upon an already burned over area.

The means 12 to secure the flaps or flexible paddles 11 to the rotor 10, includes a plurality of, preferably, round bars or rods 35 extending longitudinally of the cylindrical portion 15 each, having reduced ends 36, which extend into the sockets 21, as shown in Figure 5. These bars may be metallic or wooden. It will be noted that the diameter of the bar 35 is such that a U-shaped retainer or member 37, preferably of thin metal, may have its bight section 38 disposed about the bar 35 and its straight, parallel sections 39 contacting the flap or paddle 11 so that the bight portion 38 will not frictionally engage the cylindrical portion 15, thus permitting ready rotation of the retainer 37 about the bar 35. It will be noted in Figure 4 that the inner side edge 31 of the paddle or flap 11 is quite close adjacent the bar 35 but does not touch it and that the sections 39 are secured to the flap or paddle. The securing means 39' may be spaced apart rivets extending through the sections 39 and flaps or paddles 11.

Any suitable means may be provided to guide or assist in propelling the rotor 10. In the example shown, a handle 13 is provided, which includes conduits for a fluid, such as water. By way of illustration, there may be a pair of substantially L-shaped metallic members 40, with one end 41 of each extending into the openings 22. The opposite ends 42 of the members 40 may be coupled, as by elbows 43 to two like, tubular members 44 of metal coupled together at their inner ends, as by a T-coupling 45 and substantially paralleling the longitudinal axis of the cylindrical portion 15. They may be provided with a plurality of spaced-apart perforations 46 of a size and disposition to spray water in a direction toward the cylindrical portion 15. (In reality, the spray is directed upon the rotating paddles or flap, as will be subsequently described.)

Also connected with the T-coupling is a length of tubing 47 ending in suitable valve 48 as a conventional rotary plug valve, also coupled to another length of tubing 49 terminating in a conventional male coupling 50 for a hose end. It is preferred to protect this connection of tubing 49 and hose end by disposing a hand grip 51, partly surrounding the coupling 50.

In Figure 3 is shown one way the novel vehicle may be employed. The operator may carry upon his back a reservoir D containing water or other liquid employed in fighting fires, from which extends a hose 55 coupled to the coupling 50, and the flow of liquid may be regulated by manipulation of the valve 48. As the operator advances, rotor 10 will rotate, the forward free sections of the flaps or flexible paddles 11 will move by centrifugal force away from the rotor 10, straightening out the same into wide, long, flat sheets which, as the rotor rolls forward will descend, with some force, upon the burning grass over a considerable area. This force of the descending paddles or flaps, and the draft created thereby, will separate the fuel from the flame, the oxygen from the flame and/or fuel and/or heat-generated gas or gases from the flames, fuel and/or oxygen, thus following the United States Forest Service principles in grass or range-fire suppression.

As the rotor 10 rotates, the flaps or flexible paddles, after they have flattened upon the ground, will be rolled upon by cylindrical portion 15 of the rotor and several (three, in the example shown) will form a layer below the rotor, upon which (and subsequent layers, as the rotor rotates and moves forward) the rotor will rotate, thus providing a tread for the rotor. To effect this, the thickness of the flaps or flexible paddles must be taken into consideration. That is, if three flaps or paddles will form a layer below the rotor, then the shortest distance from the outer surface 18 of the cylindrical portion 15 to the edge face 19 of each disc portion 16 must be less than the shortest distance from the outer (or ground-engaging) face of the lowermost flap to the upper (or cylindrical portion-engaging face) of the uppermost flap.

Because the vehicle is constructed and operates as described, propelling the same is easy. Obviously, the rapidity with which it is propelled (either forward or backward) will govern, to a great extent, the territory covered by it, but this territory will be much greater than that which may possibly be covered by employing a hand fire fighting means (as a gunnysack or a fire mop). Paths of fire-extinguished area of substantially equal width may be created, thus providing for efficiency over the more or less haphazard paths created by the use of hand tools, since the area covered by the blanketing means thereof must, of necessity, be limited in order that they may be manipulated.

By proper manipulation of the valve 48, dependent upon the level of liquid in the reservoir D, the spray from the perforations 46 may be directed upon the ascending paddles and carried forward by them, to assist in fighting the fire.

In Figure 8 the novel apparatus is shown hung from a support with the flaps or flexible paddles in depending positions. Thus it may be seen that the apparatus occupies but small space for storage.

If desired the rotor may be weighted, by introducing water or sand through the screw-threaded opening 23 into the interior 24 of the cylindrical portion 15.

The importance of the wide, long flexible paddles or flaps is now apparent, since they not only afford treads for the rotor but also means to fight grass or range fires and suppress the same.

These flaps or flexible paddles do not snub the ground surface along their forward edges 32 or 33, as would short paddles. As they curve after flattening out upon the ground, they follow somewhat the contour of the cylidrical portion 15. It is apparent that their pivotal connections (instead of fixed, rigid connections) with the cylindrical portion 15 facilitates their mobility.

By the term "long" with respect to the flaps or flexible paddles 11, in some of the claims is meant a flap or flexible paddle long enough to not only cover an appreciable area of surface, as the ground, in front or in the rear of the rotor 10 but long enough to form a mobile tread for and secured to the rotor, with the outer surface 18 of the cylindrical portion 15 in contact with the upper surface of the flap or paddle 11.

Various changes may be made to the forms of the invention herein shown and described without departing from the spirit of the invention or scope of the claims.

What is claimed is:

1. In a fire fighting vehicle for grass and range fires, a rotor having a substantially horizontal axis of rotation; a plurality of flaps of flexible fire-resistant material, each flap having a side margin; a separate means connecting each flap, at a side margin thereof, to said rotor, with all of said means extending substantially parallel with said axis and spaced apart, one from another, the size of each of said flaps being such that a portion of at least one of said flaps will underlie said rotor upon rotation thereof, whereby said flaps will provide treads for said rotor; and means for guiding said rotor upon rotation thereof.

2. In a fire-suppressing apparatus for grass and range fires, a rotor comprising a substantially cylindrical tubular portion, disc portions closing the ends of said cylindrical portion, all of said portions having a substantially common axis and the diameters of said disc portions being alike and greater than the outer diameter of said tubular cylindrical portion; a plurality of flaps of fire-resistant material; means pivotally connecting said flaps to said rotor, including a plurality of spaced-apart rods extending from disc portion to disc portion inwardly of the edges of said disc portions and outwardly of the outer surface of said cylindrical portion, and a plurality of substantially U-shaped members, with the bight sections thereof extending about said rods, there being at least one U-shaped member for each rod, and the parallel sections of said U-shaped members secured to the inner sides of said flaps, the length of each of said flaps being such that a portion of at least one of said flaps will underlie said rotor when the rod to which said one flap is attached is in a position intermediate the lowermost and highest positions assumed by it upon rotation of said rotor; and means to guide said rotor.

3. In a fire-fighting apparatus for grass and range fires, a rotor including a pair of spaced apart members having substantially cylindrical peripheries; a plurality of spaced-apart rods associated with said members, each rod being connected at its ends to said members and bridging the space between said members; a plurality of paddles of flexible, fire-resistant material, each having an inner side edge section; means disposed along the inner side edge section of each paddle, to pivotally connect each paddle to its associated rod, the length of the said paddle being such that portions of at least two paddles will be disposed one upon another, beneath said rotor during rotation of said rotor; and handle means for said rotor.

4. In a fire-fighting apparatus for grass and range fires, a rotor including a pair of spaced apart members having substantially cylindrical peripheries; a plurality of spaced-apart rods associated with said members, each rod being connected at its ends to said members and bridging the space between said members; a plurality of paddles of flexible, fire-resistant material; means disposed along the inner side edge section of each paddle, to pivotally connect each paddle to its associated rod, the length of the said paddle being such that portions of at least two paddles will be disposed one upon another, beneath said rotor during rotation of said rotor; and handle means for said rotor including a tubular, rigid conduit having a horizontal portion thereof extending substantially parallel with and facing said rods and being disposed above the highest horizontal planes of said rods, said horizontal portion being provided with a plurality of liquid exit openings, and being disposed outwardly of the path of travel of said paddles.

PHILIP H. MURPHY.

REFERENCES CITED

The following references are of record in the file of this patent:

FOREIGN PATENTS

| Number | Country | Date |
|---|---|---|
| 167,452 | Great Britain | Jan. 26, 1922 |